United States Patent Office 3,298,175
Patented Jan. 17, 1967

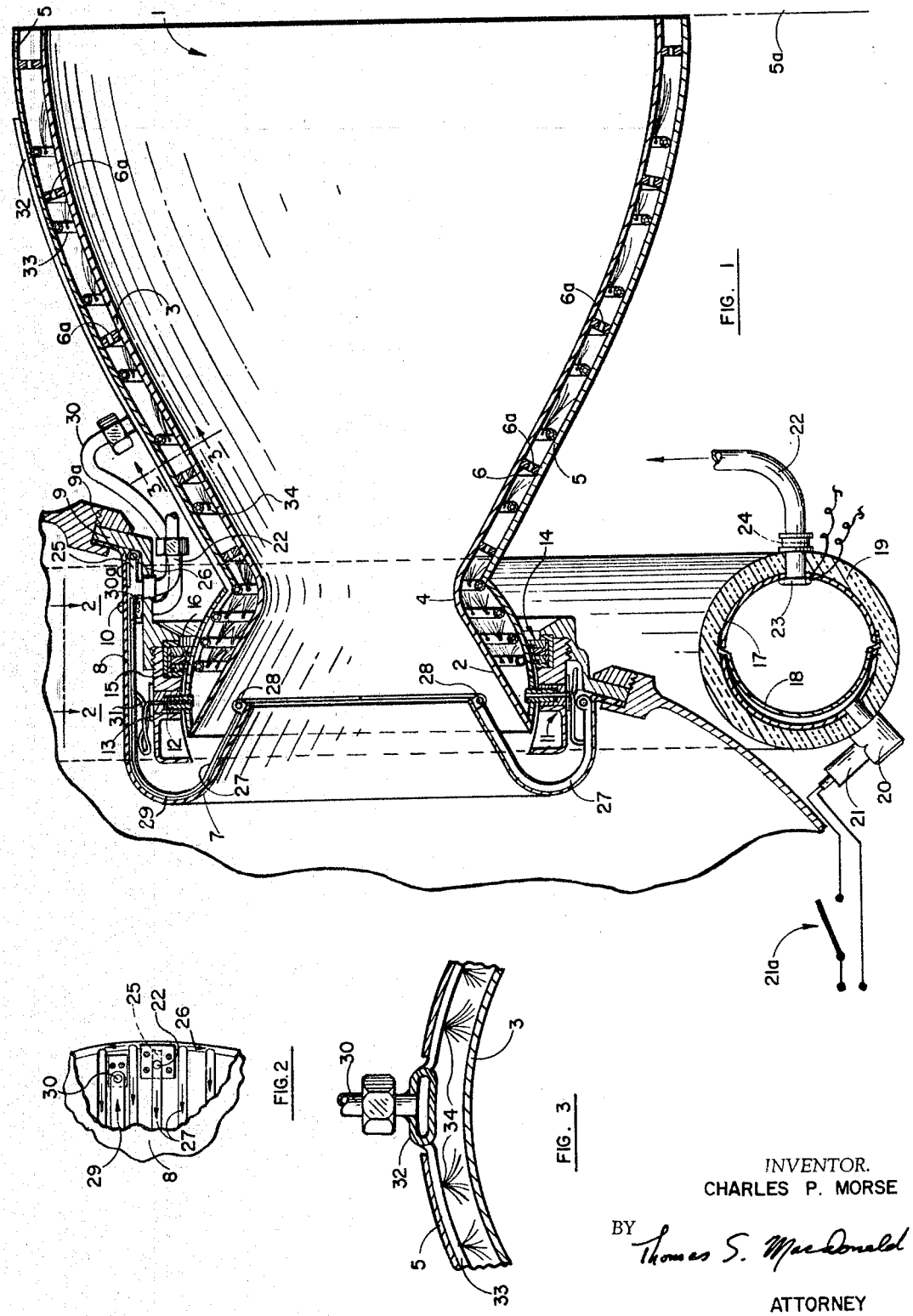

3,298,175
METHOD AND DEVICE FOR COOLING
Charles P. Morse, Pacific Palisades, Calif., granted to National Aeronautics and Space Administration under provision of 42 U.S.C. 2457(d)
Continuation of application Ser. No. 864, Jan. 6, 1960. This application Aug. 5, 1963, Ser. No. 300,957
9 Claims. (Cl. 60—267)

This invention relates to the cooling of high temperature wall members and more particularly to a rocket type nozzle employing a method and system which effectively sprays a highly efficient cooling medium against a heated wall thereof so as to produce superior cooling effects thereon. This application is a continuation of my U.S. patent application Serial No. 864 filed January 6, 1960.

The trend of modern aircraft and missiles to higher and higher speeds has resulted in a demand for highly efficient rocket nozzles. The weight of the conventional uncooled solid propellant rocket nozzle is often higher than any other component, even the motor case itself. Many prior art coolant devices have been devised to cope with the rocket nozzle weight and efficiency problem; however, the inefficiency of such systems, due to their relatively low heat absorption rate has made such solutions all but impractical.

The present invention and proposed concepts stated herein are in the nature of a breakthrough, particularly in the field of solid propellant rocket nozzle design. By maintaining a cooling medium such as lithium, which has a latent heat of vaporization of approximately 8500 B.t.u./lb. at a predetermined temperature and pressure and subsequently spraying a heated wall of a rocket nozzle with the coolant, superior cooling effects are realized. The pressure at which the cooling medium is maintained during the spraying thereof is of importance in determining the temperature at which the coolant will vaporize.

Accordingly, a principle object of this invention is to provide a novel method for cooling relatively high temperatured wall members with a highly efficient cooling medium having a very high heat absorption capacity.

A further object of this invention is to provide a novel cooling system capable of efficiently cooling the hottest operating areas of a rocket nozzle so as to afford a simplified construction and large weight savings thereof.

A still further object of this invention is to provide a novel control for activating a cooling medium used in a rocket nozzle cooling system which control is activated simultaneously with the ignition of the main propellant to thus assure efficient cooling of the nozzle when the engine is operative.

These and other objects of the invention will become apparent from the following description taken in connection with the accompanying drawings, in which:

FIG. 1 discloses the longitudinal cross section of one preferred invention embodiment of the invention disclosing an expansion type rocket nozzle and cooling system therefore;

FIG. 2 is a section taken on lines 2—2 of FIG. 1;

FIG. 3 is a section taken on lines 3—3 of FIG. 1.

A prime purpose of this invention is to provide a method and cooling system for a rocket nozzle wherein molten lithium or the like having a heat absorption capacity of approximately 10,000 B.t.u./lb. is maintained in a tank at a predetermined temperature and pressure. The tank is formed into two compartments with an expulsion type diaphragm member providing for the separation thereof. When the engine is ignited, a gas generator means is simultaneously activated so as to pressurize the compartment on one side of the expulsion diaphragm means. As a consequence to this pressurizing effect the cooling medium is forced through conduits formed on a flame shield of the engine which shield protects the mounting elements of the rocket nozzle. This initial cooling effect of the flame shield is achieved by taking advantage of the heat transfer by conduction between the relatively high temperatured flame shield and the low temperatured flowing coolant. Subsequent to this initial cooling, the coolant is forced into spray conduits positioned radially of and adjacent the outer wall of the double-walled nozzle. The cooling medium is sprayed against the outer surface of the inner shell of the nozzle so that the spray patterns overlap, thus assuring sufficient coverage thereof. Strategic portions of the nozzle, for example, the throat section, may be provided with an increased number of spray tubes and nozzles since the heat flux thereat is relatively higher than the other parts of the nozzle. Since molten lithium, which constitutes the preferred cooling medium of this invention, has excellent wetting ability and low viscosity (at 1800° F. lithium is 0.4 that of water at room temperature) the lithium spreads out into a thin layer and vaporizes when exposed to a predetermined pressure and temperature. Subsequent to the spraying step, the vaporized coolant is ducted to the exterior of the nozzle.

FIG. 1 discloses a preferred embodiment of applicant's nozzle and coolant system therefore, wherein the inner shell of the nozzle 1 is shown as comprising a converging section 2, a diverging section 3, both joined so as to form a restricted throat portion 4. A thin outer shell, or casing 5, surrounds the inner shell of the nozzle and is secured thereto by circumferential washer type structural ribs 6. The ribs may be formed to contain holes or apertures 6a therein to permit the hereinafter described cooling medium to pass therethrough subsequent to the cooling operation thereof or may take the form of posts radially and strategically positioned between the shells. The number and relative positioning of the structural support ribs 6 is a matter of choice and design, dependent on the specific application thereof.

One purpose of the outer shell 5 is to permit the collecting and ducting of the coolant vapor produced in the chamber formed between the two shells overboard of the nozzle (at the lower or right hand end as viewed in FIG. 1). The outer shell 5 also protects the inner shell from exterior aerodynamic environments. The nozzle shells are preferably constructed of a molybdenum alloy or other suitable available rocket nozzle alloys having sufficiently high strength and the necessary thermal-conductivity properties needed when the nozzle is subjected to the severe operating temperatures occasioned by the exiting combustion chamber gases.

The inside surface of the inner shell of the nozzle may be coated with flame sprayed stabilized zirconium-oxide or the like, so as to provide a thermal barrier and reduce the heat flux therein. If so desired the zirconium-oxide coating may be subsequently flame sprayed with a thin coating of tungsten to enhance the non-errosive properties thereof.

A first portion 7 of a flame shield is positioned adjacent the converging section 2 of the inner shell of the nozzle and a second portion 8 thereof is positioned adjacent the outer wall. The second portion 8, by means of a structural member 9, is adapted to be retained to a structural member of an aircraft missile or the like which carries the rocket motors. The structural member 9 may in turn be fastened to the aircraft by any convenient type fastening means such as a circumferential screw type as shown at 9a. The flame shield may be secured to the structural member 9 by any convenient conventional type securing means 10 such as bolts, rivets and the like.

The prime purpose of the flame shield is to prevent contaminating constituents inherent in the exiting propulsion exhaust gases from interfering with the operation of the mechanism mounting the nozzle assembly to the aircraft. For example, if exiting high velocity aluminum oxides, a by-product inherent in conventional type propellant exhaust gases, were to be driven into this mechanism a jamming of the nozzles pivot means 11, could possibly occur. However, by using the flame shield the only contaminating aluminum oxide laden gas capable of interfering with the pivot means resulting from the limited turbulence occurring at the exit aperture of the flame shield.

The flame shield is preferably fabricated from a relatively thick molybdenum alloy, although other conventional type materials may be employed. The shield and relative dimensions thereof may be constructed in acceptance with the specifications of the inner shell of the nozzle 1, which shield construction must provide for the desired pressure differential across the flame shield wall, further provide a safety factor for hoop stresses produced thereat and be of such construction so as to withstand the extremely high temperatured gases exiting therethrough. As will be hereinafter described, the same cooling medium used to cool the inner nozzle shell is initially utilized to cool the flame shield. The heat flux at the shield exit aperture has been determined to approach 3 B.t.u./sec. per square inch thus necessitating a cooling system therefore.

Pivot means 11 are provided to permit the controlled pivoting of the nozzle for thrust vector control (vector controls not shown). Stub pivot shafts 12, constructed of a high strength alloy, are diametrically opposed radially of and secured to the outer shell 5 of the nozzle. The pivot shafts 12 are mounted at their outer ends in bearing inserts 13 which are in turn securely mounted to stationary support 9. Any convenient material may be used for the fabrication thereof; however, such material must be capable of withstanding temperatures in the range of 600° F. An aperture, the function of which will be later described, is formed in the shaft 12 and insert 13 so as to connect a line 31 with the spray chamber formed between the outer and inner shells of the nozzle.

A sealing means is provided as at 14 and is circumferential of outer shell 5 and includes a triple piston ring assemblage 15 and retaining rings 16 for the retainment thereof. The piston rings 15 are preferably constructed of a material dissimilar to that which constitutes the outer shell 5 so that rubbing motion occasioned by the selective pivotal movements of the nozzle 1 may occur without galling. Several suitable materials are available which retain high strength at extremely high temperatures and which will provide the aforementioned function. Such materials include tantalum and columbium alloys and the like.

The cooling system for the nozzle as shown in the preferred embodiment of FIG. 1, comprises a toroidal shaped tank 17 formed of two identical diametrically opposed sections, which may be constructed of SAE 1020 steel or other like equivalent which is compatible with molten lithium for long term storage purposes (less than 0.001 in/year corrosion rate). The tank 17 circumferentially encompasses the rocket nozzle and is secured to the aircraft by any conventional type fastening device (not shown). A flexible expulsion type diaphragm 18, which separates the tank into two compartments, is preferably constructed of a relatively thin soft iron type material (e.g., .010 Armco iron), and is secured to tank 17 by means of the split nature thereof (FIG. 1). The corrosion rate of soft iron is also approximately 0.001 in/year when subjected to a lithium environment and therefore constitutes an excellent diaphragm member. Insulation material 19 is formed around the tank and may consist of any well-known and conventional type.

A pressure relief valve passage 20 connects one of the divided compartments of the tank to a gas generator 21. The gas generator is capable of containing a small (0.1 lb.) grain which is electrically ignited upon operation of switch 21a (by some suitable timing mechanism) to supply current from a current source (not shown). It will be appreciated by those skilled in the art that the gas generator 21 may be electrically connected to the main combustion chamber of the rocket engine so as to ignite simultaneously with the ignition of the main propellant. Upon actuation of the gas generator, the gas therein pressurizes a coolant retained in the tank 17 by way of the expulsion diaphragm 18 which in turn directs the coolant toward an outlet passage 22. An electric heater device 23 is formed on the inner wall of the tank around passage 22 and is adapted to be controlled (controls not shown) so as to maintain the coolant material at a predetermined temperature during storage. If heater 23 proves inadequate for any specific application, it is to be understood that it may be formed on the inner surface of tank 17 in any desired shape.

A diaphragm means 24 which may also be constructed of a soft iron material or the like, but is much thinner than diaphragm 18, is located within the passage conduit 22 and is adapted to burst and permit the passage of the cooling medium through conduit 22 when the pressure in the tank reaches a predetermined amount.

As clearly viewed in FIG. 1 and FIG. 2, passage conduit 22 terminates at and is operatively connected to an inlet port 25 formed on the underside of the second portion 8 of the flame shield. The inlet port dumps the coolant into a toroidal inlet manifold 26, which in turn distributes the coolant medium to the outlet conduits 27 (FIG. 2). The outlet conduits 27 are spaced circumferentially on the underside of the shaped flame shield and spaced radially outwardly of the longitudinal axis of the nozzle and are selectively positioned thereon so as to impart the predetermined desired cooling effects thereto. As clearly shown in FIG. 2 the outlet conduits 27 permit the coolant to flow along strategic portions of the flame shield and are connected to and terminate at a toroidal outlet manifold 28 so as to dump the coolant therein. The outlet manifold 28 is in turn connected by a single inlet conduit 29 which runs substantially parallel to conduits 27 and returns the coolant to its connection with tubing 30 at 30a (FIG. 1).

It is to be noted that if so desired a small flexible tubing 31 may be tapped into one of the outlet conduits 27 to permit a small flow of coolant to flow through the bearing insert 13 and stub pivot shaft 12, the construction of which was hereinbefore described.

Subsequent to the passage of the coolant material to flexible tube 30, the coolant medium is passed to nozzle manifold 32 which is shown in the preferred embodiment as comprising a single tubular manifold (FIG. 3) a first portion of which is exterior of and on the longitudinal axis of outer shell 5 and co-extensive with section 3 of the inner shell. A second portion of the manifold 32 is co-extensive with section 2 of the inner shell but is positioned interior of outer shell 5 through a hole formed therein. Such a construction of the second portion of the manifold 32 is necessary so as not to interfere with the sealing means 14 and pivoting means 11. The manifold 32 connects to rib type spray conduits 33 which are circumferentially positioned within the passage formed between the inner and outer shells. FIG. 3 more clearly illustrates the structural relationship of the first portion of the manifold wherein the manifold 32 is shown exterior of inner shell 5 and is operatively connected to spray conduits 33 which are in turn projected at substantially right angles therefrom.

Orifice jets 34 are selectively formed in the spray conduits and are effective to spray an ascertained amount of coolant therethrough in a predetermined spray pattern. The diameter of the orifices as well as number thereof are arranged to provide for an approximate pressure drop of 100 p.s.i. (approximately 50 p.s.i. is lost due to the pressure head losses resulting from the aforementioned passage flows), across the orifices to thus assure for complete atomization of the coolant. An orifice diameter of .005 inch has proved adequate to achieve such pressure drops. The relative positioning and number of manifolds 32, conduits 33 and orifice jets 34 may be varied and depends on the specific application thereof.

It is to be understood that the passage formed between the outer and inner shells of the nozzle and the apertures 6a formed in the ribs 6 are to be constructed with clearance therein so as to permit the ducting overboard of the vaporized cooling medium at the exit plane 5a of the nozzle in such a way as to insure a pressure drop which will be less than that required to maintain the temperature of the cooled nozzle wall at below the desired temperature as long as adequate coolant flow is continued.

Cooling constituents such as sodium (Na), lithium boro-hydride (Li $BH_4$), lithium hydride (LiH) and lithium, have been found to constitute satisfactory cooling media. The preferred coolant medium as hereinafter described has been found to be lithium, since the heat absorption capacity thereof is 9870 B.t.u./lb. when heated to its boiling point substantially from the melting point and vaporized under typical conditions of temperature and pressure as compared with conventional heat sink materials which have heat absorption capacities in the nature of 305 B.t.u./lb. Lithium's viscosity of .55 centipoise at 400° F. and .41 at 1800° F. (approximately half that of water at room temperature) provides for a coolant medium which will effectively spread out on the wall member to be cooled. Furthermore, it is of interest to compare the above with the capacity of atypical liquid propellant engine coolant, the heat absorption capacity of which is about 50 B.t.u./lb.

The aforementioned and herein employed coolant media will absorb more heat per pound than the conventional type by utilizing the heat absorbed by decomposition and/or the latent heat of fusion and evaporation in addition to the specific heat thereof. The illustrated use of such substances as hereinafter described has the further additional advantage that the continuous ejection overboard of the coolant during a missile power flight provides for ever decreasing the equivalent dead weight thereof.

The weight of lithium required for any specific application is based on the heat flux and the surface area at each section of the member to be cooled and the fact that lithium is heated and subsequently vaporized. When molten lithium at 400° F. is sprayed on a heated high temperature wall, for example, and the vapor pressure is conservatively assumed to be that corresponding to 1700° F., the heat absorbed by the liquid metal is approximately 1300 B.t.u./lb. as the average specific heat over this temperature range (1300°) is 1.0 B.t.u./lb. ° F. The latent heat of vaporization at (1700° F.) is 8480 B.t.u./lb. so that the total heat absorption capacity of the molten lithium is 9780 B.t.u./lb. Therefore, it can be seen that the utilization of lithium as the coolant medium in the described manner will provide for a relatively high weight savings in any specific application wherein an efficient cooling system for a relatively high temperature member is required.

*Method of Operation*

The hereinafter described method of cooling a rocket nozzle is by way of illustration only and should not be construed as intending to limit the novel concepts presented herein. The cited pressures and temperatures, are merely set forth to fully describe one application of applicant's novel concepts.

According to one specific application and method of cooling, it is to be assumed that the FIG. 1 nozzle embodiment is subjected to and rendered operative at an altitude of 85,000 ft. (as the second stage of a multi-stage vehicle, for example) in which case the ambient pressure to which the coolant is vented overboard will be .32 p.s.i. and the pressure drop in the passage between the inner shell and outer shell 5 of the nozzle is arranged to be approximately .32 p.s.i. In the preferred application, the separation distance between the outer and inner shells of the nozzle is approximately one-half of an inch and the apertures 6a are so constructed so as to provide for the aforementioned less than .32 p.s.i. drop therethrough. The boiling point of lithium will consequently be 1800° F. (at .64 p.s.i.a.). The temperature of the outer shell 5 will not exceed this value throughout the flight as long as the desired pressure and coolant flow are maintained, while the outer surface of the inner shell will be held at this temperature plus the temperature drop between the film and shell surface which is dependent on the film coefficient for boiling heat transfer for molten lithium (approximately 14,100 B.t.u./ft.$^2$/hr. ° F.).

During ascent of the rocket to 85,000 ft. molten lithium is maintained at approximately 400° F. in the electrically heated (heater 23) and insulated toroidal shaped tank 17 as shown in FIG. 1. Sufficient insulation 19 is provided so that by maintaining the heater 23 at approximately 300 watts of generated output, the lithium will be constantly held at 400° F. Should it be found that the electric heater 23 is far too demanding so as to create an excessive load on the tapped power source (used during pre launch storage), the heater may be eliminated and in lieu thereof the insulation may be increased or a slurry of lithium powder in a small quantity of suitable inert liquid may be utilized. Such a fluidizing constituent may comprise, for example, 77% sodium (Na) and 23% potassium (K) for 10° F. melting point.

When the gas generator 21 is activated, the pressure in the compartment on the combustion chamber side of the expulsion diaphragm 18 is maintained at approximately 150 p.s.i.a. by means of the conventional pressure relief valve 20 which is also capable of ducting any excess gas generated from the gas generator overboard of the system. It has been determined that such a construction is capable of according a 100 p.s.i. pressure drop across the exit orifices 34, assuring efficient distribution of the molten lithium and further allowing 50 p.s.i. pressure drop due to the pressure head losses resulting from the flowing of the lithium through the lines 22, 25, 26, 27, 28, 29, 30, 32, and 33 of the cooling system.

When the main propellant is ignited in the combustion chamber, a small grain located in gas generator 21 is ignited so as to pressurize the coolant (lithium) contained in tank 17. The pressurized expulsion diaphragm forces the coolant 18 against the burst diaphragm 24 causing the breaking thereof thus allowing the molten lithium to pass therethrough. The lithium passes through the passage 22, inlet port 25, inlet manifold 26 and outlet conduits 27 so as to cool the flame shield by making use of its heat capacity due to the specific heat (approximately 1 B.t.u./lb.) of the coolant.

The molten lithium enters the conduits 27 at approximately 400° F. and exits into line 28 at a higher temperature of approximately 1800° F. The molten lithium subsequently flows through the toroidal outlet manifold 28 and proceeds through inlet conduit 29, flexible tube 30, nozzle manifold 32 and spray conduits 33.

The spray conduits 33 provide a dual function in that they support the outer shell 5 thus imparting rib strength thereto and secondly distribute the lithium through the jet orifices 34. The spray pattern of the exiting lithium vapor, as hereinbefore stated, may be set to overlap the adjacent spray pattern so that all areas of the outer surface of the inner shell of the nozzle will receive sufficient coverage even though some of the orifices may become plugged. As hereinbefore stated, molten lithium has excellent wetting ability and low viscosity (at 1800° F. the latter is 0.4 that of water at room temperature) and therefore spreads out into a thin film and subsequently vaporizes.

Subsequent to the spraying and vaporizing step, the vapor is ducted overboard at the nozzle exit by way of the passage formed between the outer shell 5 and the inner shell 3 and the apertures 6a formed in the ribs 6. Such a ducting overboard is generally required since the lithium burns intensely in air and would cause the entire exterior of the nozzle to be bathed in flames if it were vaporized directly from the sprayed surface to the ambient air.

As hereinbefore stated, the boiling point of lithium at 0.64 p.s.i.a. is 1800° F., thus the aforedescribed method providing that the temperature of the outer shell will not exceed this value throughout the flight while the outer surface of the inner shell will be held at this temperature plus the temperature drop between the film and surface, which is dependent on the film coefficient for boiling heat transfer for molten lithium.

As also hereinbefore stated, other cooling media such as sodium, lithium boro-hydride, lithium hydride which have similar cooling properties to that of lithium have been investigated. The use of lithium has proved to be most efficient for all around general application.

Applicant's described novel method and cooling device is deemed to constitute a major breakthrough in conventional rocket design since weight saving and simplicity thereof is of the utmost importance in modern missile applications. Furthermore, due to the fact that the described cooling media is capable of being constantly dumped overboard of the aircraft during the cooling of the rocket nozzle, the initial relatively low dead weight of the cooling media is evermore decreased.

Although the invention has been described and illustrated in detail it is to be understood that the same is by way of illustration and example only and is not to be taken by way of limitation, the spirit and scope of this invention being limited only by the terms of the appended claims.

The novel concepts as stated herein may be employed to cool any high temperature wall member. For example, the hereinbefore described method and cooling device may find urgent need and ready application in boilers, blast furnaces, combustion engines, missile nose cones, leading edges of hypersonic vehicles and as specifically described herein, rocket nozzles.

It is to be further understood that the method of this invention may be practiced with any conventional and convenient type spray system and is not restricted solely to the specific embodiment hereinbefore described. For example, the tank 17, retaining the coolant medium, may be mounted in a conventional manner adjacent the wall to be cooled.

I claim:

1. The combination of a rocket nozzle and cooling system therefor, said rocket nozzle comprising a converging and diverging section joined to form a restricted throat portion therebetween;
   a flame shield positioned adjacent said converging section; said cooling system comprising:
   tank means adapted to retain a coolant therein;
   expulsion means adapted to expel said coolant from said tank;
   a passage means operatively connected to said tank adapted to carry the coolant;
   conduit means formed in predetermined positions on said flame shield and operatively connected to said passage means to receive the coolant therein; said conduit means operatively connected to a manifold means adjacent the outer surface of the rocket nozzle;
   spray means operatively connected to said manifold and positioned adjacent the periphery of said rocket nozzle so as to spray predetermined patterns of the coolant thereon thereby cooling said rocket nozzle.

2. The combination of a rocket nozzle and cooling system therefor, said rocket nozzle having an inner shell having a converging and diverging section joined to form a restricted throat portion therebetween, an outer shell member circumferential of and connected to said inner shell;
   pivot means connected to said outer shell adjacent the converging section of the inner shell and on the exterior thereof;
   a flame shield positioned adjacent said converging section of said inner shell; said pivot means operatively connecting said nozzle to said flame shield so as to provide for limited pivotal movement of said nozzle relative to said flame shield, said cooling system comprising:
   tank means adapted to retain a coolant therein;
   passage means connected to said tank means and connected to conduits formed on selective portions of said flame shield, said conduits adapted to receive the coolant therein when the pressure in said tank means reaches a predetermined amount; said conduits connected to a manifold formed adjacent said outer shell to receive the coolant therein;
   spray means formed on the inner surface of said outer shell member and connected to said manifold;
   orifice means formed in selective arrangement on said spray means adapted to spray predetermined amounts of said coolant on the outer surface of said inner shell member.

3. A method for cooling a rocket nozzle with a molten coolant selected from the group consisting of sodium, lithium, lithium boro-hydride and lithium hydride, said rocket nozzle having a shell with a converging and diverging section connected by a restricted passage and a flame shield adjacent the converging section and between the converging section and a combustion chamber of an engine comprising the steps of:
   maintaining the molten coolant in melted form;
   passing the molten coolant on selected portions of the flame shield;
   subsequently flowing the coolant radially of and adjacent the nozzle shell and
   spraying the coolant on the outer surface of the nozzle shell.

4. The combination of a rocket nozzle and cooling system therefor, said rocket nozzle comprising:
   an inner shell member having a converging and a diverging section joined to form a restricted throat portion therebetween and
   an outer shell member circumferential of and radially spaced from said inner shell member and structurally fastened thereto;
   a flame shield constructed and arranged radially of said outer shell member and comprising a first portion positioned adjacent an inner wall portion of the converging section of said inner shell member and a second portion positioned adjacent an outer wall portion thereof;
   conduit means constructed and arranged on said flame shield; said coolant system comprising:
   coolant retaining means for retaining a cooling constituent therein and operatively connected to said conduit means;
   expulsion means operatively connected to said coolant retaining means for selectively expelling said coolant therefrom;
   manifold means constructed and arranged adjacent said outer shell member and operatively connected to said conduit means;
   spray means constructed and arranged between said inner shell member and said outer shell member and operatively connected to said manifold means for selectively spraying predetermined amounts of coolant into said inner shell member.

5. The invention of claim 4 further comprising:
pivot means for mounting said outer shell member to the second portion of said flame shield; and
sealing means mounted adjacent said pivot means and circumferentially abutting said outer shell member and said flame shield so as to afford a sealing arrangement thereat.

6. A cooling system operatively associated with a heated wall member of a heat source for effecting a cooling thereof, said cooling system comprising:
a coolant retaining means;
a coolant retained in said coolant retaining means selected from the group consisting of sodium, lithium, lithium boro-hydride and lithium hydride;
means operatively connected to said coolant retaining means for selectively discharging said coolant therefrom;
passage means operatively connected to said coolant retaining means for receiving said discharged coolant therein;
a flame shield means adjacent to said heat source and adapted to be subjected to intense heat therefrom, said flame shield having first conduit means formed thereon and operatively connected to said passage means for receiving said coolant therein;
a plurality of second conduit means adjacent to said wall member and operatively connected to said first conduit means for receiving said coolant therein; and
orifice means formed in said second conduit means in juxtaposed relation to said wall member for spraying said coolant thereon.

7. The method of cooling a structure comprising;
providing a liquid coolant consisting of lithium,
heating said structure to a temperature corresponding to the vaporization point of lithium, and
spraying said liquid coolant on said structure.

8. A method of cooling a rocket engine or the like having wall means comprising;
operating said engine whereby said wall means are heated,
providing a source of coolant selected from the group consisting of sodium, lithium, lithium boro-hydride and lithium hydride,
heating said coolant to a temperature sufficient to melt said coolant,
maintaining said coolant in a molten state, and
spraying said coolant on said heated wall means,
whereby said coolant will vaporize upon contact with said wall means to cool said wall means.

9. A method according to claim 8 and further comprising exhausting said vaporized coolant overboard of said rocket engine.

References Cited by the Examiner

UNITED STATES PATENTS

| | | |
|---|---|---|
| 1,860,891 | 5/1932 | Goddard. |
| 2,397,658 | 4/1946 | Goddard _____ 60—35.6 |
| 2,492,569 | 12/1949 | Goddard. |
| 2,852,916 | 9/1958 | Hearn et al. _____ 60—35.6 |
| 3,024,606 | 3/1962 | Adams et al. _____ 60—35.6 X |
| 3,026,806 | 3/1962 | Runton et al. |
| 3,069,850 | 12/1962 | Ledwith et al. _____ 60—54.54 |
| 3,097,766 | 7/1963 | Biehl et al. _____ 60—39.48 X |

OTHER REFERENCES

Woodruff, O. J., et al.: "Coolants," Nucleonics, June 1953, pages 27–32.

Sittig, M.: "A New Look at Lithium Metal," British Chemical Engineering, March 1958, pages 130–132.

MARK NEWMAN, *Primary Examiner.*

SAMUEL LEVINE, *Examiner.*

D. HART, *Assistant Examiner.*